United States Patent [19]

Press et al.

[11] Patent Number: 5,619,492
[45] Date of Patent: Apr. 8, 1997

[54] CDMA COMMUNICATION SYSTEM IN WHICH BIT RATES ARE DYNAMICALLY ALLOCATED

[75] Inventors: Harry B. Press, Sandy; Thomas R. Giallorenzi, Salt Lake City; Mark T. Rafter, Park City, all of Utah

[73] Assignee: Unisys Corporation, Blue Bell, Pa.

[21] Appl. No.: 491,033

[22] Filed: Jun. 16, 1995

[51] Int. Cl.$^6$ .................................................. H04J 13/04
[52] U.S. Cl. .................... 370/441; 370/468; 359/136
[58] Field of Search ........................... 370/18, 84, 95.1; 375/205, 200; 359/136

[56] References Cited

U.S. PATENT DOCUMENTS

| 5,442,625 | 8/1995 | Gitlin et al. | 370/18 |
| 5,490,136 | 2/1996 | Sereno et al. | 370/18 |
| 5,495,483 | 2/1996 | Grube et al. | 370/84 |

Primary Examiner—Douglas W. Olms
Assistant Examiner—Min Jung
Attorney, Agent, or Firm—Charles J. Fassbender; Mark T. Starr; Steven R. Petersen

[57] ABSTRACT

A CDMA communication system is provided in which bit rates are dynamically allocated by a single CDMA receiving station to a plurality of CDMA transmitting stations, all of which are intercoupled to each other over a CDMA channel and a feedback channel. Each CDMA transmitting station includes a control circuit which sends control signals on the CDMA channel in spaced apart time intervals which request respective bit rates on the CDMA channel; and, the CDMA receiving station includes a bit rate allocating circuit which receives and responds to the control signals by sending feedback messages over the feedback channel that address individual CDMA transmitting stations and grant respective bit rates to the addressed station. In one preferred embodiment, each transmitting station includes a data buffer which stores a time varying number of data bytes that are to be sent, and each transmitting station requests respective bit rates on the CDMA channel by including that number in the control signals.

10 Claims, 5 Drawing Sheets

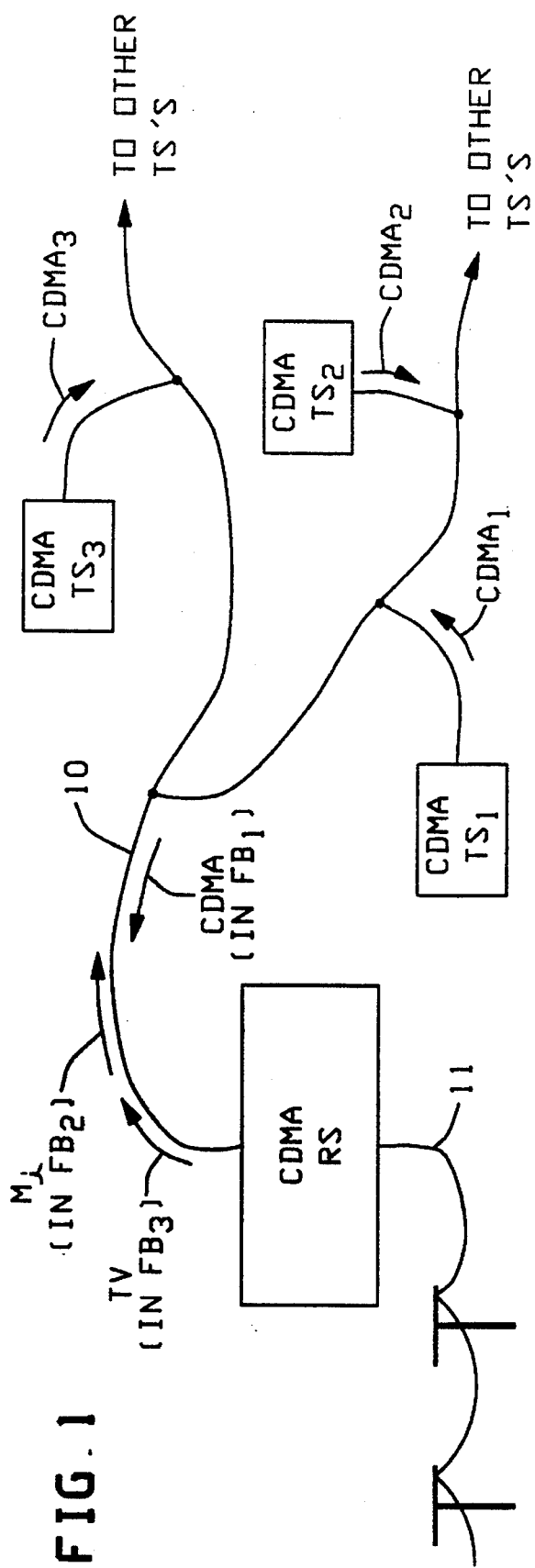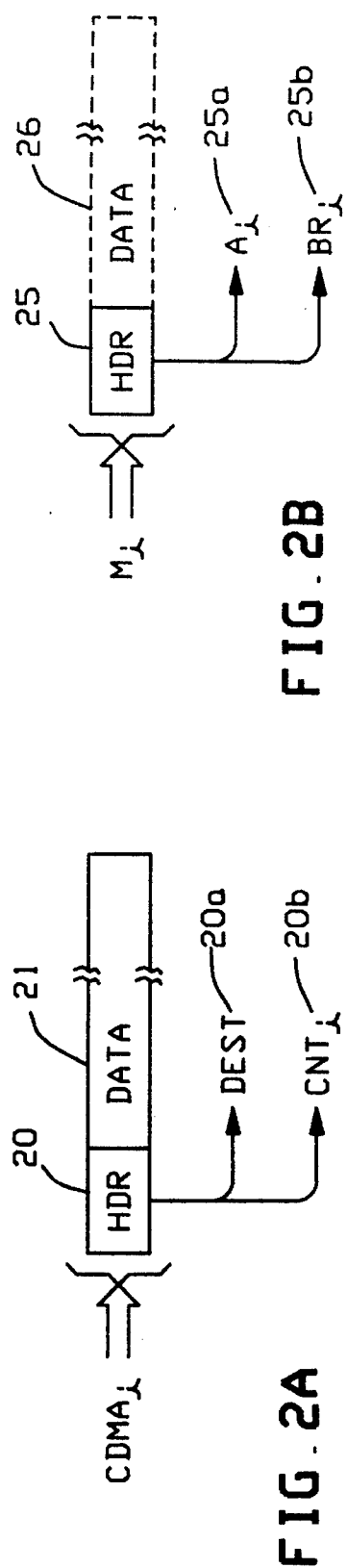

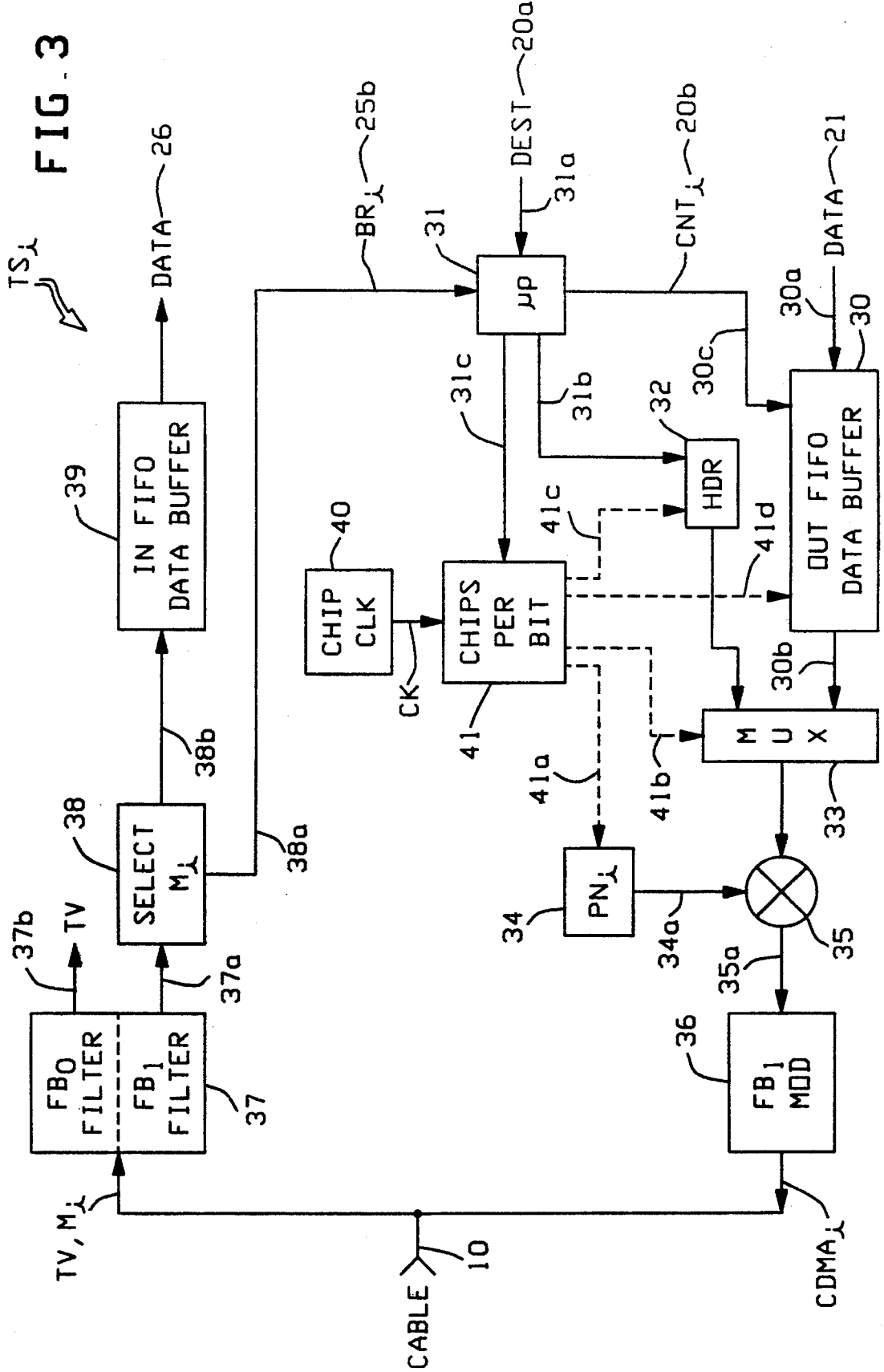

CDMA COMMUNICATION SYSTEM IN WHICH BIT RATES ARE DYNAMICALLY ALLOCATED

BACKGROUND OF THE INVENTION

This invention relates to communication systems; and more particularly, it relates to multipoint-to-point CDMA communication systems.

As used herein, the term "multipoint-to-point" refers to a communication system in which multiple transmitting stations, which are located at respective points, simultaneously send separate data blocks to a single receiving station which is located at one other point. That is, a first data block is sent by a first transmitting station, a second data block is sent by a second transmitting station, etc.; and, any number of these data blocks can be sent at the same time.

One way to operate such a system is to have each transmitting station send its data as an amplitude modulated signal in its own wireless channel which differs in frequency for each transmitting station. However, if the total number of transmitting stations in the communication system is large, then a corresponding large number of separate frequency bands is required. Alternatively, each transmitting station can send its data over a separate optical fiber to the receiving station. However, when the receiving station is remotely located from the transmitting stations, too much connecting optical fiber is required.

By comparison, with a multipoint-to-point CDMA communication system, all of the transmitting stations send their data in either a single wireless channel or a single optical fiber. By the term "CDMA" is herein meant "Code Division Multiple Access." In a CDMA system, each transmitting station encodes the data that it sends with a respective spreading code which is unique to that station. Then, the encoded data from all the transmitting stations is sent simultaneously on a single wireless channel/optical fiber in one frequency band to the receiving station.

In the receiving station, the data from any one particular transmitting station is recovered by exclusive-oring the composite CDMA signal with the same spreading code which was used to encode the data. One prior art CDMA receiving station is described in U.S. Pat. No. 4,908,836 by Rushforth, et al., entitled "Method and Apparatus for Decoding Multiple Bit Sequences That Are Transmitted Simultaneously in a Single Channel". Also, another CDMA receiving station is described in U.S. Pat. No. 5,031,173 by Short, et al., entitled "Decoder for Added Asynchronous Bit Sequences". Both of these patents are assigned to the assignee of the present invention.

In the prior art, each transmitting station can have a first-in-first-out data buffer (FIFO data buffer) which temporarily holds the data that is to be transmitted. With a FIFO data buffer, the data that is to be transmitted is written into the buffer from an external source at one bit rate, while simultaneously, data is read from the buffer and transmitted to the receiving station at a different bit rate. Consequently, if the rate at which data is written into the buffer exceeds the rate at which data is read from the buffer during a long time period, then an overload condition can occur wherein the storage capacity of the data buffer is exceeded.

Also, in the prior art, the number of stations which actually transmit CDMA data at any one time instant can vary greatly. For example, suppose that the CDMA communication system includes 100 different transmitting stations. In that case, the number of transmitting stations which actually transit CDMA data at the same time instant can vary from 1 to 100. Thus, when each transmitting station sends its data at a fixed bit rate, then a dilemma occurs. If the bit rate of each transmitting station is set high, the total bit rate capacity of the CDMA network can be exceeded whenever a large numbered stations are actually transmitting. But if the bit rate of each transmitting station is set low, then a buffer overload can frequently occur.

Accordingly, a primary object of the present invention is to provide an improved multipoint-to-point communication system in which the above drawbacks are overcome.

BRIEF SUMMARY OF THE INVENTION:

With the present invention, a CDMA communication system is provided in which bit rates are dynamically allocated. This CDMA communication system includes a plurality of CDMA transmitting stations and a single CDMA receiving station, all of which are intercoupled to each other over a CDMA channel and a feedback channel. Each CDMA transmitting station includes a control circuit which sends control signals on the CDMA channel in spaced apart time intervals which request respective bit rates on the CDMA channel; and, the CDMA receiving station includes a bit rate allocating circuit which receives and responds to the control signals by sending feedback messages over the feedback channel that address individual CDMA transmitting stations and grant respective bit rates to the addressed station. Each CDMA transmitting station receives those feedback messages which have its address, and each CDMA transmitting station sends CDMA data on the CDMA channel at the bit rates granted in the received feedback messages.

In one preferred embodiment, each transmitting station includes a data buffer which stores a time varying number of data bytes that are to be sent, and the transmitting station requests respective bit rates on the CDMA channel by including that number in the control signals. Also in one preferred embodiment, each CDMA transmitting station encodes its data with a spreading code at a fixed number of chips per second and a selectable number of chips per bit in response to the granted bit rate. Further, in one preferred embodiment, the bit rate allocating circuit tallies the bit rates which it grants in the feedback messages, and it maintains that tally below a predetermined maximum aggregate bit rate for the CDMA channel.

BRIEF DESCRIPTION OF THE DRAWINGS:

FIG. 1 shows an overview of a CDMA communication system which constitutes one preferred embodiment of the present invention.

FIG. 2A shows a format for CDMA signals which are sent by several CDMA transmitting stations in the FIG. 1 communication system.

FIG. 2B shows a format for feedback messages which are sent by one CDMA receiving station to several CDMA transmitting stations in the FIG. 1 communication system.

FIG. 3 is a detailed circuit diagram of a preferred embodiment for each CDMA transmitting station in FIG. 1.

Figure 4:
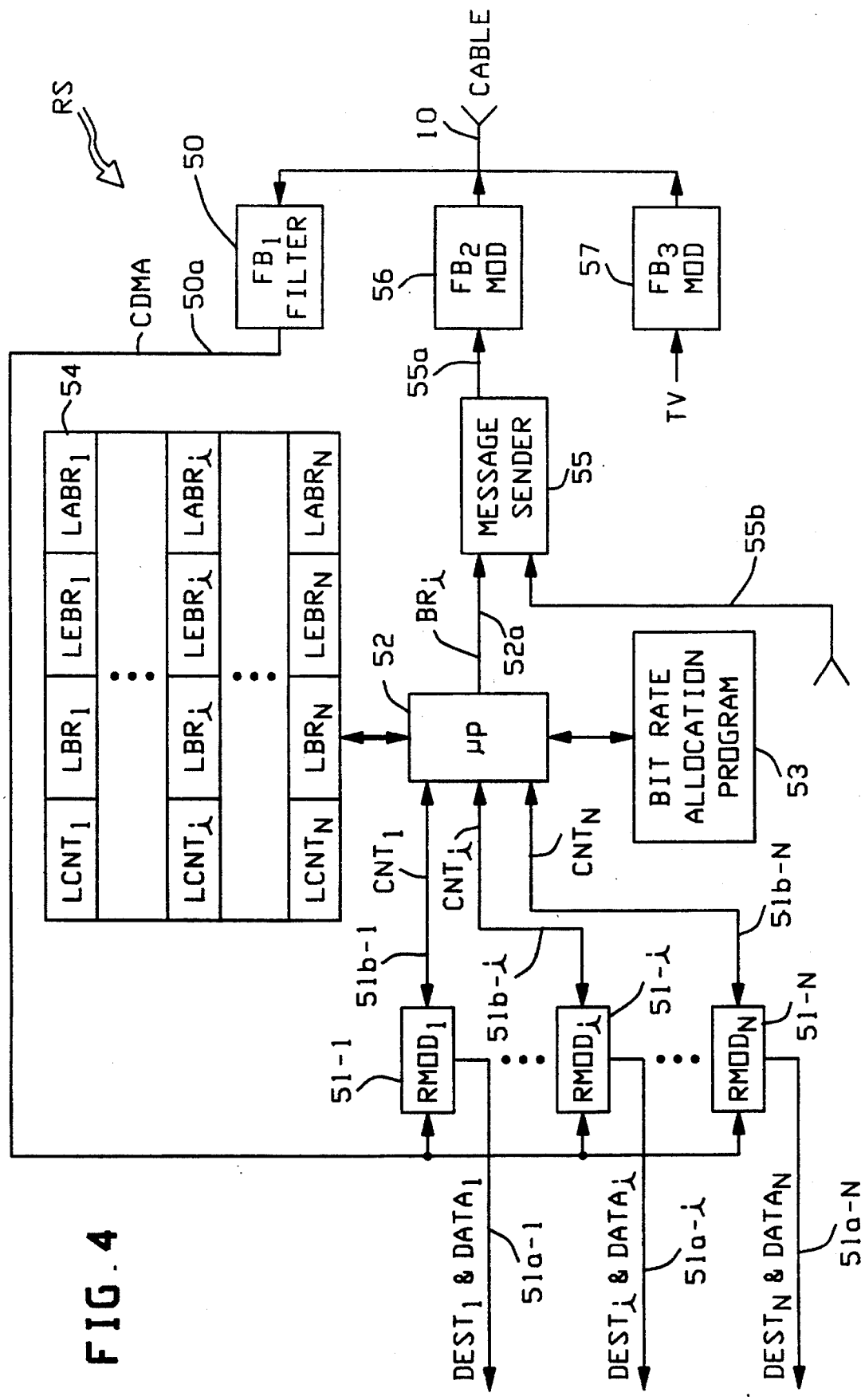
FIG. 4 is a detailed circuit diagram of a preferred embodiment for the CDMA receiving station in FIG. 1.

DETAILED DESCRIPTION:

Referring now to FIG. 1, a CDMA communication system which constitutes one preferred embodiment of the present invention will be described. This FIG. 1 embodiment includes a plurality of CDMA transmitting stations $TS_1$, $TS_2$, $TS_3$, . . . etc.; and it includes a single CDMA receiving station RS. All of the CDMA transmitting stations and the single CDMA receiving station are interconnected to each other by a single coaxial cable 10 as shown.

Suitably, the coaxial cable 10 is a pre-existing cable in a conventional cable television network. In that case, the cable 10 carries standard cable television signals which in FIG. 1 are labeled TV; the, CDMA transmitting stations are located in respective houses which receive the TV signals; and the CDMA receiving station is located in the cable television plant which supplies the TV signals. All of the TV signals occur in a frequency band $FB_0$, and they are not used by the CDMA transmitting stations or the CDMA receiving station.

Each CDMA transmitting station $TS_i$ operates by sending signals $CDMA_i$ over the cable 10 to the receiving station RS. That is, station $TS_1$ sends signals $CDMA_1$; station $TS_2$ sends signals $CDMA_2$; etc. Any number of these signals can occur on the cable 10 simultaneously whereupon they are added together to form a composite signal CDMA. Each of the signals $CDMA_1$, $CDMA_2$, etc., fully occupy the same frequency band $FB_1$ which is separate from the frequency band $FB_0$.

In response to each of the $CDMA_i$ signals, the receiving station RS sends a feedback message $M_i$ on the cable 10 back to the corresponding transmitting station $TS_i$. These feedback messages occur in a frequency band $FB_2$ which is separate from the frequency bands $FB_0$ and $FB_1$. Since the three frequency bands $FB_0$, FB1, and $FB_2$ are all separate from each other, the corresponding TV signals and CDMA signals and feedback messages $M_i$ can all occur on the cable 10 at the same time without interfering with each other.

FIG. 2A shows a preferred format for each of the signals $CDMA_i$; and FIG. 2B shows a preferred format for each of the feedback messages $M_i$. In FIG. 2A, each of the $CDMA_i$ signals includes a header 20 that is followed by a block of data 21, which is a fixed number of data bits. This header 20 identifies a destination 20a to which the data 21 is forwarded over a network 11 by the receiving station RS. Network 11 can be any conventional communication network, such as a telephone network.

Also, the header 20 includes a count 20b; and this count constitutes a request by the transmitting station $TS_i$ to send its data 21 at a certain bit rate. Specifically, when the count is high, the count constitutes a request to transmit data at a correspondingly high bit rate; whereas when the count is low, the count constitutes a request to transmit data at a correspondingly low bit rate. Preferably, each transmitting station $TS_i$ includes a first-in-first-out data buffer which stores a time varying number of data bytes that are to be sent. In that case, the count 20b which is sent in the header equals the number of data bytes that are stored in the data buffer.

Within the receiving station RS, the count 20b in each of the $CDMA_i$ signals is received. Then, in response to the count $CNT_i$, the receiving station RS sends the feedback messages $M_i$ over the cable 10 which address the CDMA transmitting station $TS_i$ and grants a particular bit rate to the addressed station. This is shown in FIG. 2B wherein each message $M_i$ includes a header 25; and that header may, or may not, be followed by a block of data 26. In the header 25, an address $A_i$ is included which addresses a particular CDMA transmitting station $TS_i$. Also in the header 25, a bit rate $BR_i$ is included which is granted to the addressed transmitting station.

In one preferred embodiment of the CDMA receiving station which will be described shortly in conjunction with FIG. 4, a microprocessor is included which tallies the bit rates that are granted in the feedback messages $M_i$. By keeping this tally, the CDMA receiving station RS is able to grant bit rates in the messages $M_i$ which maintain the total bit rate for all of the $CDMA_i$ signals below a predetermined maximum aggregate bit rate $BR_{max}$.

For example, suppose the maximum aggregate bit rate for all of the $CDMA_i$ signals on the cable 10 is ten $M_{bps}$ (10 megabits per second); and suppose further that only three stations $TS_1$, $TS_2$, and $TS_3$ have data to transmit. In that case, at one time instant, the respective bit rates which are granted to the transmitting stations $TS_1$, $TS_2$ and $TS_3$ could be 1 Mbps, 2 Mbps and 6 Mbps. Thereafter, due to a change in the count signals $CNT_i$, the respective bit rates which are granted could be 5 Mbps, 1 Mbps, and 4 Mbps.

Suitably, the maximum aggregate bit rate $BR_{max}$ is set at about 90 percent of a bit rate at which errors start to occur in the data that is recovered by the receiving station RS. This leaves about 10 percent of the aggregate bit rate for any stations $TS_i$ which are not currently transmitting $CDMA_i$ signals to start their transmissions.

Turning now to FIG. 3, a preferred internal structure for each of the CDMA transmitting stations $TS_i$ will be described. This FIG. 3 embodiment includes several electronic modules 30–41; and each of these modules is identified below in Table 1.

TABLE 1

| MODULE | DESCRIPTION |
| --- | --- |
| 30 | A first-in-first-out data buffer (FIFO) which receives data on an input 30a and sends data on an output 30b. This data buffer generates the count signal $CNT_i$, on an output 30c, equal to the number of data bytes that are stored in the data buffer. |
| 31 | A microprocessor, such as a Motorola 680X0 chip, including an associated instruction memory. |
| 32 | A register which holds the header 20 of the signals $CDMA_i$. |
| 33 | A 2 × 1 multiplex. |
| 34 | A spreading code generator which generates a spreading code $PN_i$ on an output 34a. |
| 35 | An exclusive-or logic gate which exclusive-or's signals from the multiplexer 33 with the spreading code $PN_i$ from the generator 34 and sends the result to an output 35a. |
| 36 | A modulator circuit which generates, on the cable 10, a frequency shifted replica of the output signals from the exclusive-or gate 35. This frequency shifted signal is signal $CDMA_i$ in the frequency band $FB_1$. |
| 37 | A pair of filters, one of which passes the messages $M_i$ in the frequency band $FB_2$ from the cable 10 to output 37a, and another which passes the television |

TABLE 1-continued

| MODULE | DESCRIPTION |
|---|---|
|  | signals TV in the frequency band $FB_0$ to output 37b. |
| 38 | A message selecting circuit which examines the address in each message $M_i$ and passes only those messages which have the address $A_i$ that is assigned to the particular transmitting station $TS_i$. |
| 39 | A first-in-first-out data buffer (FIFO) which stores data from circuit 38 when that data is preceded by a header which contains address $A_i$. |
| 40 | A chip clock generator which generates a clock signal CK at a fixed frequency which equals the chip rate of the spreading code (i.e. signal CK is 10 MHz if the chip rate is 10 million chips per second). |
| 41 | A control circuit which responds to commands from the microprocessor 31. Each command selects the number of chips in the spreading code which encode a single bit of transmitted data. |

Likewise, a preferred internal structure for the CDMA receiving station is shown in FIG. 4. This FIG. 4 embodiment includes several electronic modules 50–57; and each module is identified below in Table 2.

TABLE 2

Figure 5:
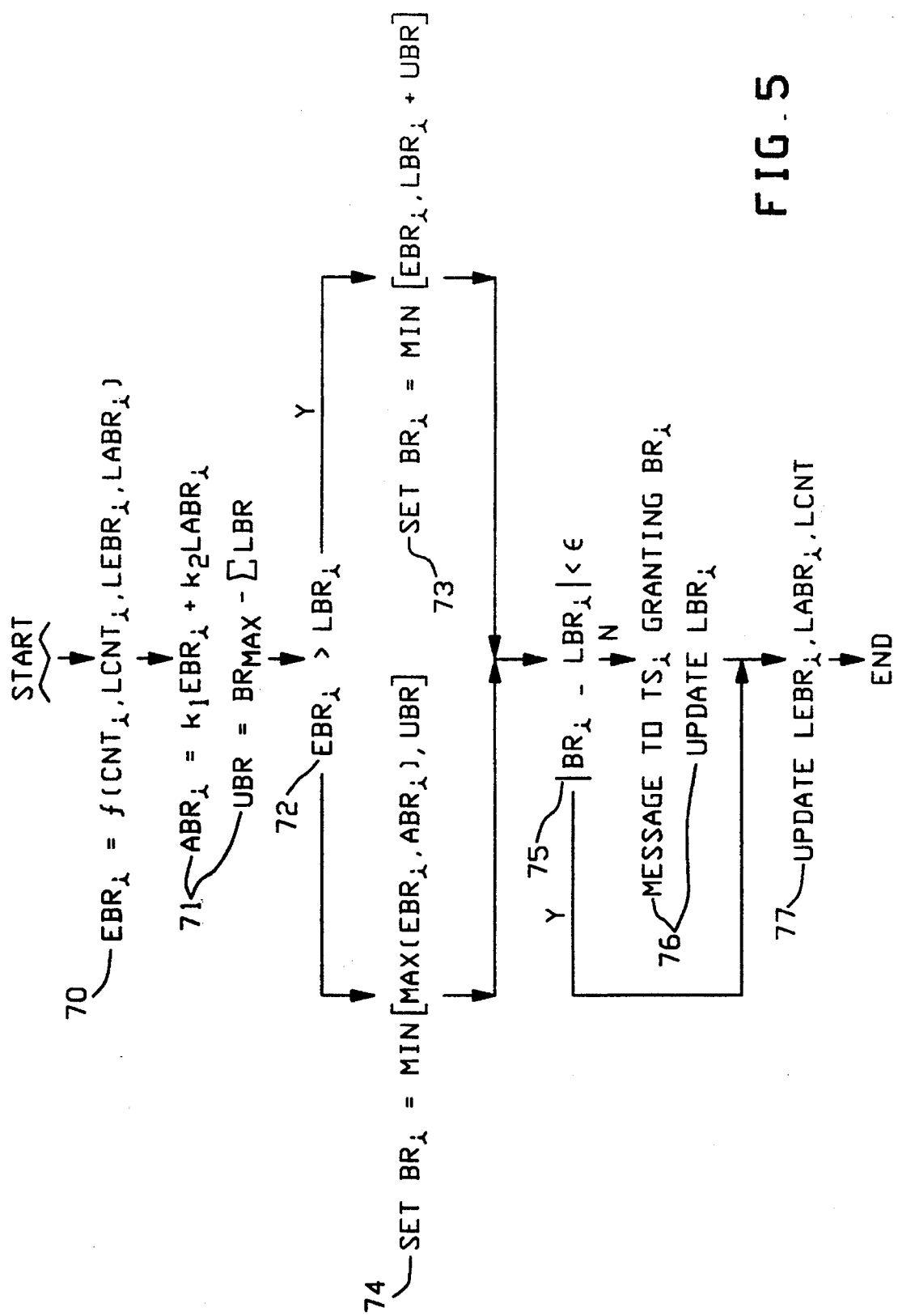
FIG. 5 shows a preferred embodiment of a bit rate allocation program which is executed by the CDMA receiving station in FIG. 4.

| MODULE | DESCRIPTION |
|---|---|
| 50 | A filter which receives all of the signals on the cable 10, and which passes to an output 50a just the CDMA signals in frequency band $FB_1$. |
| 51-1 thru 51-N | Each of these is a CDMA receiver module. Module 51-i locks onto the spreading code $PN_i$ in the composite CDMA signal from the cable 10. After locking, module 51-i recovers the header 20 and the data 21 which is in the $CDMA_i$ signal. All of the data 21 along with the destination 20a in the header is passed to an output 51a–i; whereas the count 20b in the header is passed to an output 51b–i. |
| 52 | A microprocessor, such as a Motorola 680X0 chip. |
| 53 | A memory in which a bit rate allocation program is stored. One preferred embodiment of this program is shown in FIG. 5. Execution of this program by the microprocessor 52 generates the bit rate signals $BR_i$. |
| 54 | A memory which stores several parameters that are used by the bit rate allocation program in memory 53. |
| 55 | A message formatting circuit which receives the bit rate signals $BR_i$ on output 52a from the microprocessor 52, and which formats them along with any data block 26 as the messages $M_i$ on output 55a. |
| 56 | A modulator circuit which receives the messages $M_i$ from circuit 55 and replicates them on the cable 10 in the frequency band $FB_2$. |
| 57 | A circuit which receives the television signals TV from an external source and passes those signals to the cable 10 in frequency band $FB_0$. |

In operation, all of the electronic modules 30–41 of the FIG. 3 CDMA transmitting station $TS_i$ and all of the electronic modules 50–57 of the FIG. 4 CDMA receiving station RS interact with each other as follows. Initially, when data is to be transmitted by the FIG. 3 transmitting station, the destination 20a for the data is sent to the microprocessor 31 on an input 31a. Thereafter, the data 21 which is to be transmitted is sequentially loaded one byte at a time into the data buffer 30 via the data buffer input 30a. This data 21 along with its destination 20a can come from any external module, such as a home computer.

As each data byte is loaded, the count signal $CNT_i$ on the data buffer output 30c is incremented by one; and this count signal is sensed by the microprocessor 31. When the count signal $CNT_i$ indicates that the data buffer 30 stores at least a certain minimum number of data bytes (e.g. 32 data bytes), the microprocessor 31 generates the header 20 by sending the destination 20a and the count 20b on an output 31b to register 32. Then, to start transmitting the $CDMA_i$ signals, the microprocessor 31 sends a command on a output 31c to the control circuit 41. This command specifies the number of chips of spreading code $PN_i$ which encode each bit of the $CDMA_i$ signals; and initially it is set a predetermined number.

Control circuit 41 responds to the command by sending several control signals on its outputs 41a–41d. The control signals on output 41a direct the generator 34 to start generating the spreading code $PN_i$ on output 34a. The control signals on output 41b direct the multiplexer 33 to pass either the header from register 32 or the data from data buffer 30 to the modulator 35. The control signals on output 41c cause the header to be read bit-by-bit from the register 32. And the control signals on output 41d cause the data words to be read bit-by-bit from the data buffer 30 and cause the count signals $CNT_i$ to be decremented by one each time a byte of data is read.

Each bit of the header from register 32 and each bit of the data from the data buffer 30 which passes through the multiplexer 33 to the logic gate 35 is exclusive-or'd with several chips of the spreading code $PN_i$. The number of chips per bit is determined by the command which microprocessor 31 sent to the control circuit 41. Then, the encoded signals on output 35a go to circuit 36 where they are shifted into the frequency band $FB_1$. This generates the $CDMA_i$ signals which travel on the cable 10 to the FIG. 4 receiving station.

In the receiving station of FIG. 4, the $CDMA_i$ signals pass through the $FB_1$ filter 50 to the CDMA receiver modules 51-1 through 51-N. Module 51-i locks onto the spreading code $PN_i$ in the composite CDMA signal from the filter output 50a; and module 51-i then recovers the header 20 and the data 21 which is in the $CDMA_i$ signal. Suitably, in order to perform this operation of recovering the header 20 and the data 21 in the $CDMA_i$ signal, each read module 51-1 through 51-N has an internal structure as disclosed in U.S. Pat. Nos. 4,908,836 and 5,031,173 which are assigned to the assignee of the present invention.

All of the data 21, as well as its destination 20a, which is recovered by the read module 51-i is presented on an output 51a-i. From that output, the data 21 is forwarded to its destination 20a in a conventional fashion, such as by a modem over the telephone network 11 in FIG. 1. Conversely, the count signal $CNT_i$ which is recovered by the read module 51-i is sent on an output 51b-i to the microprocessor 52.

Each time the microprocessor 52 receives one of the count signals $CNT_i$, the microprocessor grants a corresponding bit rate $BR_i$. To generate this $BR_i$ signal, the microprocessor 52 executes the bit rate allocation program which is stored in memory 53; and one preferred embodiment of the bit rate allocation program will be described shortly in conjunction with FIG. 5.

During the execution of the bit rate allocation program, several parameters are utilized which are stored in memory 54. Those parameters are labeled in FIG. 4 as $LCNT_i$, $LBR_i$, $LEBR_i$, and $LABR_i$. Parameter $LCNT_i$ is the last value of the count signal $CNT_1$ which was recovered by the read module 51-i. Parameter $LBR_i$ is the corresponding last bit rate which was granted in response to the last count signal. Parameter $LEBR_i$ is the last estimate of a minimum bit rate which station $TS_i$ needs to insure that its data buffer 30 does not overflow. One such estimate is made by the microprocessor 52 for each count signal $CNT_i$ which it receives. Parameter $LABR_i$ is a running average of the parameter $LEBR_i$ as it is generated for station $TS_i$ over time.

Each bit rate signal $BR_i$ which is generated by the microprocessor 52 is sent back to the read module $RMOD_i$ and to circuit 55. Module $RMOD_i$ stores the bit rate $BR_i$ for later use, whereas circuit 55 immediately uses the bit rate signals $BR_i$ to form the header 25 which was previously described in conjunction with FIG. 2B. Also, circuit 55 appends to the header, a block of data 26 whenever that block has been received on input 55b for the same CDMA transmitting station which is to receive the bit rate signals $BR_i$. Then, the header 25 (and any appended data 26) is sent by circuit 55 on an output 55a to the modulator circuit 56. That circuit 56 replicates the header 25 and data 26 on the cable 10 in the frequency band $FB_2$; and each such replication constitutes a feedback message $M_i$.

Feedback message $M_i$ travels on the cable 10 to the CDMA transmitting station $T_i$ whereupon it goes through the $FB_2$ filter 37 to the filter output 37a. Then, circuit 38 examines the address $A_i$ in the message $M_i$. If the address $A_i$ matches an address which is preassigned to the transmit station $TS_i$, the corresponding bit rate signal $BR_i$ is sent on an output 38a to the microprocessor 31. Also, if the address $A_i$ matches the address for the transmit station $TS_i$, then any data 26 which follows the header is sent by circuit 38 on an output 38b to the data buffer 39. Thereafter, the data which is stored in the buffer 39 is read by an external module, such as a home computer.

Each bit rate signal $BR_i$ on output 38a is read by the microprocessor 31; and in response, the microprocessor 31 converts the received bit rate $BR_i$ to a corresponding chips-per-bit command. If the received bit rate $BR_i$ is high, the corresponding command specifies a small number of chips per bit; and vice versa. Command #1 selects X chips per bit; command #2 selects X+1 chips per bit; ... command #N selects X+N−1 chips per bit. Preferably, X is an integer in the range of sixteen to two-hundred fifty-six.

Then, the microprocessor 31 sends the command which specifies the new chip-per-bit ratio on its output 31c. In response, at the start of the next header, the control circuit 41 changes the control signals on its outputs 41a–41d such that the $CDMA_i$ signals are transmitted with the new chip-per-bit ratio. Thereafter, the entire sequence as explained above repeats over and over again.

One preferred structure for the bit rate allocation program 53 which is executed by the CDMA receiving station is shown in FIG. 5. This FIG. 5 program consists of a set of steps 70 through 77, each of which will now be described.

in step 70, an estimate is made of the minimum bit rate which station $TS_i$ needs in order to insure that its output data buffer 30 does not overflow. This estimated bit rate $EBR_i$ is determined as a predetermined function f( ) of the parameters $CNT_i$, $LCNT_i$, $LEBR_i$, and $LABR_i$. All of those parameters are read by the microprocessor 52 from the memory 54. By this function f( ), the estimated bit rate $EBR_i$ will increase over the last estimated bit rate $LEBR_i$ whenever the count signal $CNT_i$ is too high and/or is continually increasing. Conversely, the estimated bit rate $EBR_i$ will decrease over the last estimated bit rate $LEBR_i$ whenever the count signal $CNT_i$ is very low and/or is continually decreasing.

Next, in step 71, the running average $ABR_i$ of the estimated bit rates $EBR_i$ is updated by the expression $k_1 BR_i + k_2 LABR_i$. Here, the terms $k_1$ and $k_2$ are constants which, for example, may respectively be 0.2 and 0.8. Also in step 71, the unused aggregate bit rate UBR for the CDMA channel is determined by evaluating the expression $BR_{max} - \Sigma LBR$. This unused aggregate bit rate UBR is the peak amount by which the last bit rate $LBR_i$ can be increased without exceeding the capacity of the CDMA channel.

Next, step 72 is performed wherein a test is made to determine whether the estimated $EBR_i$ is an increase or a decrease over the last bit rate $LBR_i$ that was granted to station $TS_i$. If the estimated bit rate $EBR_i$ is an increase over the last bit rate $LBR_i$, then step 73 is performed. Otherwise, step 74 is performed.

In step 73, a new bit rate $BR_i$ for station $TS_i$ is set to the estimated bit rate $EBR_i$ provided that the maximum aggregate bit rate $BR_{max}$ for the CDMA channel will not be exceeded. If that maximum aggregate bit rate $BR_{max}$ would be exceeded, then the new bit rate $BR_i$ for station $TS_i$ is set to the last granted bit rate $LBR_i$ plus the unused aggregate bit rate UBR.

In step 74, the new bit rate $BR_i$ is set to one of three difference values. If the estimated bit rate $EBR_i$ is larger than the running average bit rate $ABR_i$ and less than the unused aggregate bit rate $UBR_i$, then the new bit rate $BR_i$ is set equal to $EBR_i$. If the running average bit rate $ABR_i$ is larger than the estimated bit rate $EBR_i$ and less than the unused aggregate bit rate UBR, then the new bit rate $BR_i$ is set equal to $ABR_i$. Otherwise, the new bit rate $BR_i$ is set equal to the unused aggregate bit rate UBR.

Next, in step 75, the magnitude of the difference between the new bit rate $BR_i$ and the last granted bit rate $LBR_i$ is compared to a threshold $\epsilon$. If that threshold is exceeded, then step 76 is performed wherein a message is sent on the feedback channel which grants the new bit rate $BR_i$ to the CDMA transmitting station $TS_i$. Also, in step 76, the parameter $LBR_i$ is updated in the memory 54 with the newly granted bit rate $BR_i$.

Conversely, if the threshold $\epsilon$ is not exceeded, then step 76 is bypassed. In that case, the bit rate in " the transmitting station $TS_i$ remains unchanged. As a result, small bit rate changes are suppressed; and this minimizes the number of messages which are sent on the feedback channel thereby reducing overhead.

Lastly, in step 77, the parameters $LEBR_i$, $LABR_i$, and $LCMT_i$ are updated in the memory 54. Parameter $LEBR_i$ is set equal to the estimated bit rate $EBR_i$ as determined in step 70; parameter $LABR_i$ is set equal to the running average bit rate $ABR_i$ as determined in step 71; and the parameter $LCMT_i$ is set equal to the count signal $CMT_i$ which was just processed.

Figure 6:
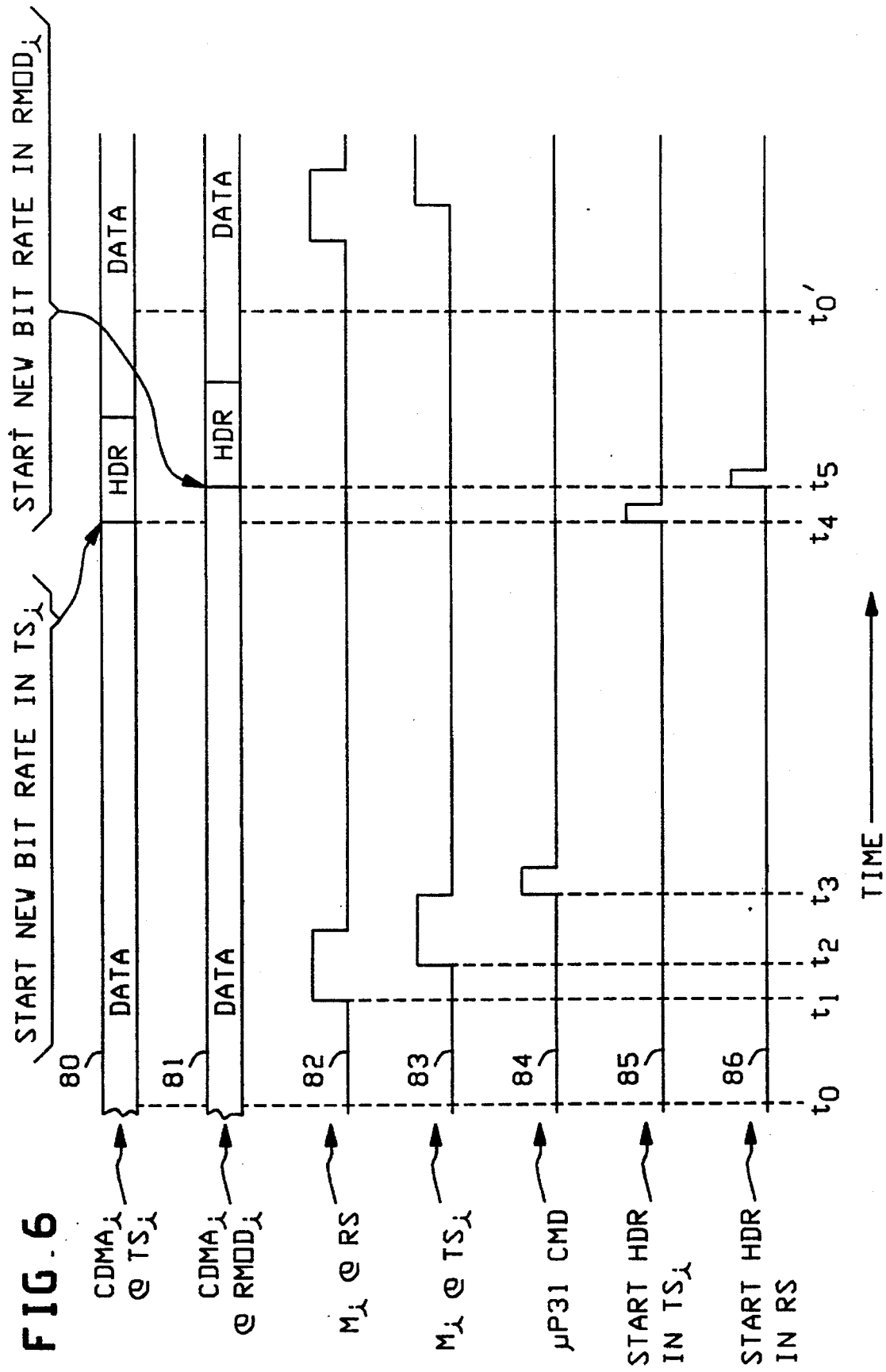
FIG. 6 is a timing diagram which illustrates a sequence by which the CDMA transmitting stations and CDMA receiving station in FIG. 1 change the bit rate at which they respectively transmit and receive data.

Turning now to FIG. 6, it provides a timing diagram which illustrates how the bit rate changes are synchronized between the transmitting station $TS_i$ and the receiving station RS. This timing diagram includes several signal waveforms that have reference numerals 80 through 86; and each of these waveforms is described below.

Waveform 80 shows the signal $CDMA_i$ at the transmit station $TS_i$. By comparison, waveform 81 shows the signal $CDMA_i$ in the receive station RS at the read module $RMOD_i$. Waveform 81 is a delayed replica of waveform 80 due to an inherent time delay which is caused by the cable 10.

Both of the waveforms 80 and 81 as shown in FIG. 6 begin at a time $t_0$ which occurs when the $CDMA_i$ signal is transmitting the data 21. Prior to time $t_0$, the header 20 was transmitted; and waveform 82 shows the feedback message $M_i$ as it is sent at the station RS in response to the count $CNT_i$ which is in the header. That message $M_i$ begins in station RS at a time $t_1$; and it includes the new bit rate $BR_i$ which is granted to the transmit station $TS_i$.

Waveform 83 shows the feedback message $M_i$ as it is received at the transmit station $TS_i$. Here again, waveform 83, which begins at time $t_2$, is a delayed replica of waveform 82 due to the inherent delay that is caused by the cable 10.

Waveform 84 shows the command which microprocessor 31 in the transmit station $TS_i$ sends to the control circuit 41 in response to the feedback message $M_i$. This command begins at a time instant $t_3$, and it specifies the new number of chips which will encode each bit in the $CDMA_i$ signal.

This new chip-per-bit ratio which is specified by the command of waveform 84 does not take effect immediately. Instead, that chip-per-bit ratio takes effect in the transmitting station $TS_i$ when the next header starts to get transmitted. This is illustrated in FIG. 6 by waveforms 80 and 85.

Waveform 85 is timing pulse which begins at time $t_4$. This timing pulse is generated within control circuit 41 of the transmit station $TS_i$ by counting the number of data bits which are read from the buffer 30 and transmitted after each header, and by generating waveform 85 when a complete block of data 21 has been sent.

Likewise, in the receive station RS, the new bit rate $BR_i$ takes effect when the next header begins to be received by the read module $RMOD_i$. This is illustrated in FIG. 6 by waveforms 81 and 86. Waveform 86 is a timing pulse that begins at a time $t_5$, which is when the next header starts being received. This timing pulse is generated within the read module $RMOD_i$ by counting the number of data bits which are received after a header, and by generating waveform 86 when a complete block of data 21 is received.

For each count signal $CNT_i$ that is sent by the transmitting station $TS_i$, the entire signal sequence which occurs during times $t_0$–$t_5$ in FIG. 6 is repeated. This is indicated in FIG. 6 by waveform 80 at time $t_0'$. At that time, more data 21 is again starting to be transmitted after the transmission of a header. Thus, time $t_0'$ corresponds to the preceding time $t_0$.

One primary feature of the above-described CDMA communication system is that it prevents the data buffer 30 in the CDMA transmitting station from becoming overloaded. This feature occurs because as the data buffer 30 fills up, the count signal $CNT_i$ on output 30c will increase; and that count signal $CNT_i$ is sent to the CDMA receiving station. If the count signal $CNT_i$ is high or increasing at a high rate, then microprocessor 52 will grant a correspondingly high bit rate $BR_i$ back to the transmitting station $TS_i$. There, microprocessor 31 will cause the high bit rate $BR_i$ to take effect by sending a command to the control circuit 41 which decreases the number of spreading code chips in each bit of the $CDMA_i$ signals.

Also, another primary feature of the above-described CDMA communications system is that the total bit rate of all of the $CDMA_i$ signals on the cable 10 is maintained below a maximum aggregate bit rate $BR_{max}$ for the channel. This is achieved by the bit rate allocation program 53 in the receiving station RS which tallies the bit rates that are granted to all of the transmitting stations. This sum of the granted bit rates is then compared to $BR_{max}$, and each new bit rate $BR_i$ is selected such that the sum does not exceed $BR_{max}$.

One preferred embodiment of a CDMA communication system which is structured according to the present invention has now been described in detail. In addition, however, many changes and modifications can be made to these details without departing from the nature and spirit of the invention.

As one such modification, the cable 10 can be replaced with any other media which carries the CDMA signals and the feedback messages $M_i$. For example, the cable 10 can be replaced with a hybrid optical fiber-coaxial cable transmission medium. Alternatively, the cable 10 can be replaced with a wireless transmission medium.

As another modification, the number of data bits in the data block 21 of the signals $CDMA_i$ can be variable. One way to implement this modification is to include a field in the header 20 before the data block which specifies the number of data bits that follow. Similarly, the number of data bits in the data block 26 of the feedback messages $M_i$ can be a variable.

As another modification, the count signal $CNT_i$ which occurs in the header 20 of FIG. 2A can be replaced with the change in the count $\Delta CNT_i$ which occurs between successive headers. This term $\Delta CNT_i$ can be generated by the microprocessor 31 in each transmitting station simply by subtracting each count from the preceding count. Similarly, the CDMA receiving station can use the term $\Delta CNT_i$ to determine the count $CNT_i$ for use in the bit rate allocation program, simply by adding successive $\Delta CNT_i$ terms together.

As another modification, the bit rates $BR_i$ which are granted in the feedback messages $M_i$ may be generated by any process which can be performed by the microprocessor 52 in the CDMA receiving station, and not just the illustrated steps of FIG. 5. For example, step 74 of the FIG. 5 process can be modified to include a test for the case where the unused aggregate bit rate UBR is essentially zero. If such a case occurs, a feedback message can be sent to a different CDMA transmitting station $TS_x$ which reduces that station's current bit rate $LBR_x$ by an amount $\Delta BR_x$. Then, the bit rate for station $TS_i$ can be set to $LBR_x$ plus $\Delta BR_x$.

Also, as another modification, each CDMA transmitting station $TS_i$ can implement the respective bit crates which it is granted by keeping the number of chips per bit fixed and varying the number of chips per second from the PN generator 34. With this modification, the number of chips per second from the PN generator 34 will increase as the bit rate which is granted by the signals $BR_i$ increases; and vice versa.

Also, as another modification, each CDMA transmitting station can send its count signals $CNT_i$ and its digital data signals at the same time. With this modification, each transmitting station $TS_i$ will include two different spreading code generators 34. One such generator is used to encode the count signals, while the other generator is used to encode the data from the data buffer.

Accordingly, it is be understood that the present invention is not limited to just the illustrated preferred embodiment, but is defined by the appended claims.

What is claimed is:

1. A CDMA communication system, in which bit rates are dynamically allocated, comprising:

a plurality of CDMA transmitting stations and a single CDMA receiving station, all of which are intercoupled to each other over a CDMA channel and a feedback channel;

each CDMA transmitting station including a control circuit which sends control signals on said CDMA channel in spaced apart time intervals which request respective bit rates on said CDMA channel;

said CDMA receiving station including a bit rate allocating circuit which receives and responds to said control signals by sending feedback messages over said feedback channel that address individual CDMA transmitting stations and grant respective bit rates to the addressed station; said bit rate allocating circuit also including a circuit that tallies the bit rates which are granted in said feedback messages, and maintains the tally below a predetermined maximum aggregate bit rate for said CDMA channel; and, each CDMA transmitting station including a receiver circuit that receives those feedback messages which address that particular station, and a data transmitting circuit which sends CDMA digital data on said CDMA channel at the bit rates granted in the received feedback messages.

2. A CDMA communication system according to claim 1 wherein each of said transmitting stations includes a data buffer which stores a time varying number of data bytes that are to be sent, and said control circuit in each transmitting station requests said respective bit rates by including said number in said control signals.

3. A CDMA communication system according to claim 1 wherein each of said transmitting stations includes a data buffer which stores a time varying number of data bytes that are to be sent, and said control circuit in each transmitting station requests said respective bit rates by including in said control signals the net variance in said number between successive control signals.

4. A CDMA communication system according to claim 1 wherein said data transmitting circuit, in each CDMA transmitting station, modulates said data with a spreading code at a fixed number of chips per second and a selectable number of chips per bit in response to said granted bit rate.

5. A CDMA communication system according to claim 1 wherein each CDMA transmitting station modulates said control signals and said digital data signals with a single spreading code but in different time intervals which are interleaved on said CDMA channel.

6. A CDMA communication system according to claim 1 wherein each CDMA transmitting station modulates said control signals and said digital data signals at the same time but with different spreading codes on said CDMA channel.

7. A CDMA communication system according to claim 1 wherein said bit rate allocating circuit responds to said control signals from one of said CDMA transmitting station by sending a feedback message to a different CDMA transmitting station which reduce that station's current bit rate, and by thereafter sending another feedback message to said one CDMA transmitting station which increases that station's current bit rate.

8. A CDMA communication system according to claim 1 wherein said CDMA channel and said feedback channel are in a single coaxial cable.

9. A CDMA communication system according to claim 1 wherein said CDMA channel and said feedback channel are in a single hybrid optical fiber-coaxial cable transmission medium.

10. A CDMA communication system according to claim 1 wherein said CDMA channel and said feedback channel are in a wireless transmission medium.

* * * * *